US009529804B1

(12) United States Patent
Muddu et al.

(10) Patent No.: US 9,529,804 B1
(45) Date of Patent: Dec. 27, 2016

(54) SYSTEMS AND METHODS FOR MANAGING FILE MOVEMENT (75) Inventors: Sudhakar Muddu, Milpitas, CA (US); Christos Tryfonas, San Francisco, CA (US); Anurag Maunder, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1368 days.

(21) Appl. No.: 12/023,941

(22) Filed: Jan. 31, 2008

Related U.S. Application Data (60) Provisional application No. 60/951,908, filed on Jul. 25, 2007, provisional application No. 60/951,912, filed on Jul. 25, 2007, provisional application No. 60/951,913, filed on Jul. 25, 2007, provisional application No. 60/951,915, filed on Jul. 25, 2007, provisional application No. 60/951,916, filed on Jul. 25, 2007.

(51) Int. Cl.
G06F 17/30 (2006.01)
G06F 11/14 (2006.01)

(52) U.S. Cl.
CPC ..... *G06F 17/30079* (2013.01); *G06F 11/1458* (2013.01); *G06F 17/30082* (2013.01); *G06F 17/30221* (2013.01)

(58) Field of Classification Search
CPC ............... G06F 17/30082; G06F 17/30079; G06F 17/30221; G06F 11/1458; G06F 11/1469
USPC .......................... 707/661, 640, 999.204, 674
See application file for complete search history.

(56) References Cited

U.S. PATENT DOCUMENTS

| 6,269,382 | B1* | 7/2001 | Cabrera ........... G06F 17/30082 |
| 6,735,691 | B1* | 5/2004 | Capps et al. ..................... 713/1 |
| 7,546,432 | B2* | 6/2009 | Stacey .............. G06F 17/30221 707/999.202 |
| 7,590,664 | B2* | 9/2009 | Kamohara et al. |
| 7,599,971 | B1* | 10/2009 | Hagerstrom ...... G06F 17/30221 |
| 7,603,397 | B1* | 10/2009 | Hagerstrom et al. |
| 7,890,527 | B1* | 2/2011 | Nene ................... G06F 11/1451 707/769 |
| 8,078,571 | B2* | 12/2011 | Eagan ............... G06F 17/30389 707/603 |
| 2002/0156891 | A1* | 10/2002 | Ulrich ............... G06F 17/30067 709/225 |
| 2002/0169827 | A1* | 11/2002 | Ulrich ............... G06F 17/30135 709/203 |
| 2003/0046313 | A1* | 3/2003 | Leung ................. G06F 11/1469 |

(Continued)

OTHER PUBLICATIONS

Armstead et al., "Implementation of a Campus-wide Distributed Mass Storage Service: The Dream vs. Reality," in Proceedings of the Fourteenth IEEE Symposium on Mass Storage Systems, 1995, pp. 190-199.*

(Continued)

*Primary Examiner* — Phuong Thao Cao
(74) *Attorney, Agent, or Firm* — Dergosits & Noah LLP; Todd A. Noah (57) ABSTRACT

A system for managing file movement between a first storage and a second storage is disclosed. The system may include a set of file manager nodes connected to the first storage and the second storage. The set of file manager nodes may be configured to move a first set of files from the first storage to the second storage based on at least the content of the first set of files.

32 Claims, 3 Drawing Sheets

(56) References Cited

U.S. PATENT DOCUMENTS

| | | | |
|---|---|---|---|
| 2003/0182301 A1* | 9/2003 | Patterson | G06F 11/1458 |
| 2004/0044698 A1* | 3/2004 | Ebata | G06F 3/0608 |
| 2004/0083202 A1* | 4/2004 | Mu | G06F 3/0622 |
| 2004/0163029 A1* | 8/2004 | Foley | G06F 11/1469 714/769 |
| 2004/0193659 A1* | 9/2004 | Carlson | G06F 17/3089 |
| 2004/0205143 A1* | 10/2004 | Uemura | H04L 29/06 709/208 |
| 2004/0210583 A1* | 10/2004 | Enko | G06F 17/30067 |
| 2004/0267830 A1* | 12/2004 | Wong | G06F 17/30079 |
| 2005/0021512 A1* | 1/2005 | Koenig | G06Q 50/22 |
| 2005/0021566 A1* | 1/2005 | Mu | G06F 11/1458 |
| 2005/0055402 A1* | 3/2005 | Sato | G06F 17/30079 709/205 |
| 2006/0010154 A1* | 1/2006 | Prahlad et al. | 707/102 |
| 2006/0010169 A1* | 1/2006 | Kitamura | G06F 3/0605 |
| 2006/0129537 A1* | 6/2006 | Torii | G06F 17/30221 |
| 2006/0161746 A1* | 7/2006 | Wong | G06F 11/1662 711/162 |
| 2006/0288048 A1* | 12/2006 | Kamohara | G06F 17/30085 |
| 2007/0022087 A1* | 1/2007 | Bahar | G06F 9/5011 |
| 2007/0079086 A1* | 4/2007 | Wang | G06F 3/0625 711/161 |
| 2007/0179990 A1* | 8/2007 | Zimran | G06F 17/30085 |
| 2007/0179997 A1* | 8/2007 | Nooning | G06F 11/1458 |
| 2007/0198611 A1* | 8/2007 | Prahlad et al. | 707/204 |
| 2007/0226213 A1* | 9/2007 | Al-Masri | G06F 17/30613 |
| 2007/0266056 A1* | 11/2007 | Stacey | G06F 17/30221 |
| 2008/0010325 A1* | 1/2008 | Yamakawa | 707/204 |
| 2008/0104145 A1* | 5/2008 | Lipman | G06F 11/1456 |
| 2008/0154988 A1* | 6/2008 | Shiozawa | G06F 3/061 |
| 2008/0307527 A1* | 12/2008 | Kaczmarski | G06F 11/1458 726/24 |
| 2009/0158020 A1* | 6/2009 | Chen | G06F 11/1451 713/2 |
| 2009/0198677 A1* | 8/2009 | Sheehy | G06F 17/30864 |
| 2009/0240700 A1* | 9/2009 | Hayashi | H04L 67/1097 |
| 2009/0249005 A1* | 10/2009 | Bender | G06F 11/1435 711/162 |
| 2013/0036022 A1* | 2/2013 | Svendsen | G06Q 30/00 705/26.7 |

OTHER PUBLICATIONS

Drakopoulos et al., "Performance Analysis of Client-Server Storage Systems," IEEE Transactions on Computers, vol. 41, No. 11, Nov. 1992, pp. 1442-1452.*

Eisler et al., "Data ONTAP GX: A Scalable Storage Cluster," in Proceedings of the 5th USENIX Conference on File and Storage Technologies (FAST '07), 2007, pp. 139-152.*

"Information Lifecycle Management: An Automated Approach," Technical White Paper, EMC Corporation, Hopkinton, Mass., Dec. 8, 2003, 20 pages.*

"U.S. Appl. No. 12/098,342", filed Apr. 4, 2008.
"U.S. Appl. No. 12/098,338", filed Apr. 4, 2008.
U.S. Appl. No. 11/933,111, filed Oct. 31, 2007.
U.S. Appl. No. 12/023,931, filed Jan. 31, 2008.
U.S. Appl. No. 12/030,158, filed Feb. 12, 2008.
U.S. Appl. No. 12/030,153, filed Feb. 12, 2008.

* cited by examiner

FIG. 1

- Screening Rules

204— SCREEN FROM 'file://primary' OPERATIONS 'CREATE' WHERE (fileExtension = 'mp3') ACTION 'BLOCK'

206— SCREEN FROM 'file://primary' OPERATIONS 'OPEN' WHERE (indexedfield.Confidential = 'YES') ACTION 'BLOCK'

208— SCREEN FROM 'file://primary' OPERATIONS 'DELETE' WHERE (client.user = 'DEMO\testuser') ACTION 'BLOCK'

- Recall Rules

210— BLOCK RESTORE TO 'file://primary' WHERE (client.ip = '10.10.130.124')

212— BLOCK RESTORE TO 'file://primary' WHERE (filesize > 1) AND (indexedfield.PCIType = 'Credit Card')

- Migration Rules

214— MIGRATE TRANSPARENT TO 'file://secondary' FROM 'file://primary' WHERE daysSince(atime) >= 365 AND filesize >= 100KB SCHEDULE DAILY at 1:00am

SYSTEMS AND METHODS FOR MANAGING FILE MOVEMENT

The present invention claims priority under 35 USC 119(e) to a commonly owned provisionally filed patent application entitled "SYSTEMS AND METHODS FOR FACILITATING MANAGEMENT OF DATA," U.S. Application No. 60/951,908, filed Jul. 25, 2007; a commonly owned provisionally filed patent application entitled "SYSTEM AND METHODS FOR HANDLING DATA," US Application No. 60/951,912, filed Jul. 25, 2007; a commonly owned provisionally filed patent application entitled "SYSTEM AND METHODS FOR SEARCHING DATA," U.S. Application No. 60/951,913, filed Jul. 25, 2007; a commonly owned provisionally filed patent application entitled "SYSTEMS AND METHODS FOR PERFORMING INTEGRATED SEARCHES WITH ACTIONS," U.S. Application No. 60/951,915, filed Jul. 25, 2007; and a commonly owned provisionally filed patent application entitled "SYSTEMS AND METHODS FOR MANAGING FILE MOVEMENT," U.S. Application No. 60/951,916, filed Jul. 25, 2007, all of which are incorporated herein by reference.

BACKGROUND OF THE INVENTION

The present invention relates to managing movement of files between data storages. For an enterprises, files may need to be moved between data storages for various purposes, such as cost saving and data security.

In general, an enterprise may employ one or more data storages for storing enterprise data. The one or more data storages may include a high-performance storage that may have a substantial amount of capacity and may be able to support many users (e.g., up to 6,000 users). The high-performance storage may generally be expensive.

Typically, a substantial percentage (e.g., up to 40%) of enterprise data may be infrequently utilized. Therefore, employing a relatively low-cost (and low-performance) secondary data storage for storing infrequently utilized files, while employing a high-performance primary storage (with reduced storage capacity) for servicing users, may result in significant cost savings for an enterprise. Accordingly, files may need to be moved between the primary storage and the second storage.

In addition to cost saving, an enterprise may also wish to employ a secondary storage for security control. For example, the enterprise may wish to store confidential files in the secondary storage and to control access to the confidential files stored in the secondary storage. The confidential files may need to be recalled from the secondary storage to the primary storage when access to the confidential files is needed.

Existing techniques for managing movement of files between data storages are typically based on file metadata. For example, a prior art file manager (e.g., a server node including software and hardware) may examine the metadata of a file to determine the last date that the file was accessed. If the date indicates that the file has not been accessed for more than a specified period of time, e.g., 1 year, the prior art file manager may move (or migrate) the file from the primary storage to the secondary storage. Upon request by a user for accessing a file that has been moved from the primary storage to the secondary storage, the file manager may recall the file from the secondary to the primary storage, such that the file may be accessed.

Managing file movement based on metadata, the existing techniques may not be able to satisfy the needs for security control. For example, since metadata may not contain sufficient information for characterizing the content of files, the prior art file manager may not be able to effectively identify confidential files to be moved to the secondary storage. Further, the prior art file manager may not be able to effectively determine confidentiality levels of files stored in the secondary storage, and therefore may not be able to effectively control access to the files in a secure manner.

SUMMARY OF INVENTION

An embodiment of the present invention relates to a system for managing file movement between a first storage (e.g., a primary storage) and a second storage (e.g., a secondary storage). The system may include a set of file manager nodes connected to the first storage and the second storage. The set of file manager nodes may be configured to move a first set of files from the first storage to the second storage based on at least the content of the first set of files.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a system for managing file movement between a first storage (e.g., a primary storage) and a second storage (e.g., a secondary storage). The first storage may include a first plurality of filers located at the same site or at different sites. The second storage may include a second plurality of filers located at the same site or different sites. The first storage may be configured to handle files at a higher speed than the second storage.

The system may include a set of file manager nodes connected to the first storage and the second storage. The set of file manager nodes may include one or more nodes configured as one or more Fpolicy secondary servers. The set of file manager nodes may be configured to move a first set of files from the first storage to the second storage based on at least the content of the first set of files. The first set of files may include one or more files. The set of file manager nodes may also be configured to move the first set of files from the first storage to the second storage based on at least one of a search result, a search report, and a database query result that includes the first set of files. The set of file manager nodes may move the first set of files according to one or more of a first round-robin arrangement, a first load-balancing arrangement, a first distributed arrangement, and a first fail-over arrangement.

The set of file manager nodes may also be configured to generate one or more directory names and one or more filenames in a filesystem of the second storage for the first set of files.

The first storage may be configured to receive requests (or triggers) from a client device. The first plurality of filers may receive the requests according to one or more of a second round-robin arrangement, a second load-balancing arrangement, a second distributed arrangement, and a second fail-over arrangement. The first storage may also be configured to send the requests to the set of file manager nodes according to at least one of a third round-robin arrangement, a third load-balancing arrangement, a third distributed arrangement, and a third fail-over arrangement.

In response to the requests, the set of file manager nodes may determine whether one of more of the requests should be granted, for example, based on one or more screening policies and data pertaining to the requests. The set of file manager nodes may trigger a rejection message to be provided through the client device. The set of file manager nodes may also recall (i.e., move or copy) a second set of files from the second storage to the first storage. The second set of files may include one or more files. The first storage may provide the second set of files to the client device.

One or more of the first storage and the second storage may support filesystem snapshots. For example, the first storage may have storage snapshots of the files present on the active file system (storage) which includes previous versions of the files on the primary storage (files or stubs). Trigger requests may be sent to the file manager nodes for stubs present in the active filesystem of the primary storage or when copying a stub from a snapshot to the active filesystem of the primary storage.

The system may also include a metadata filer connected to the set of file manager nodes. The metadata filer may store data pertaining to movement of one or more of the first set of files and the second set of files. The metadata filer may also store metadata of a third set of files stored in a first filer among the first plurality of filers. The metadata of the third set of files may be applied to a copy of the third set of files (which is not stored in the first filer) in case of failure of the first filer. The metadata filer may be managed utilizing a standard storage tool, e.g., SnapMirror.

The features and advantages of the invention may be better understood with reference to the figures and discussions that follow.

Figure 1:
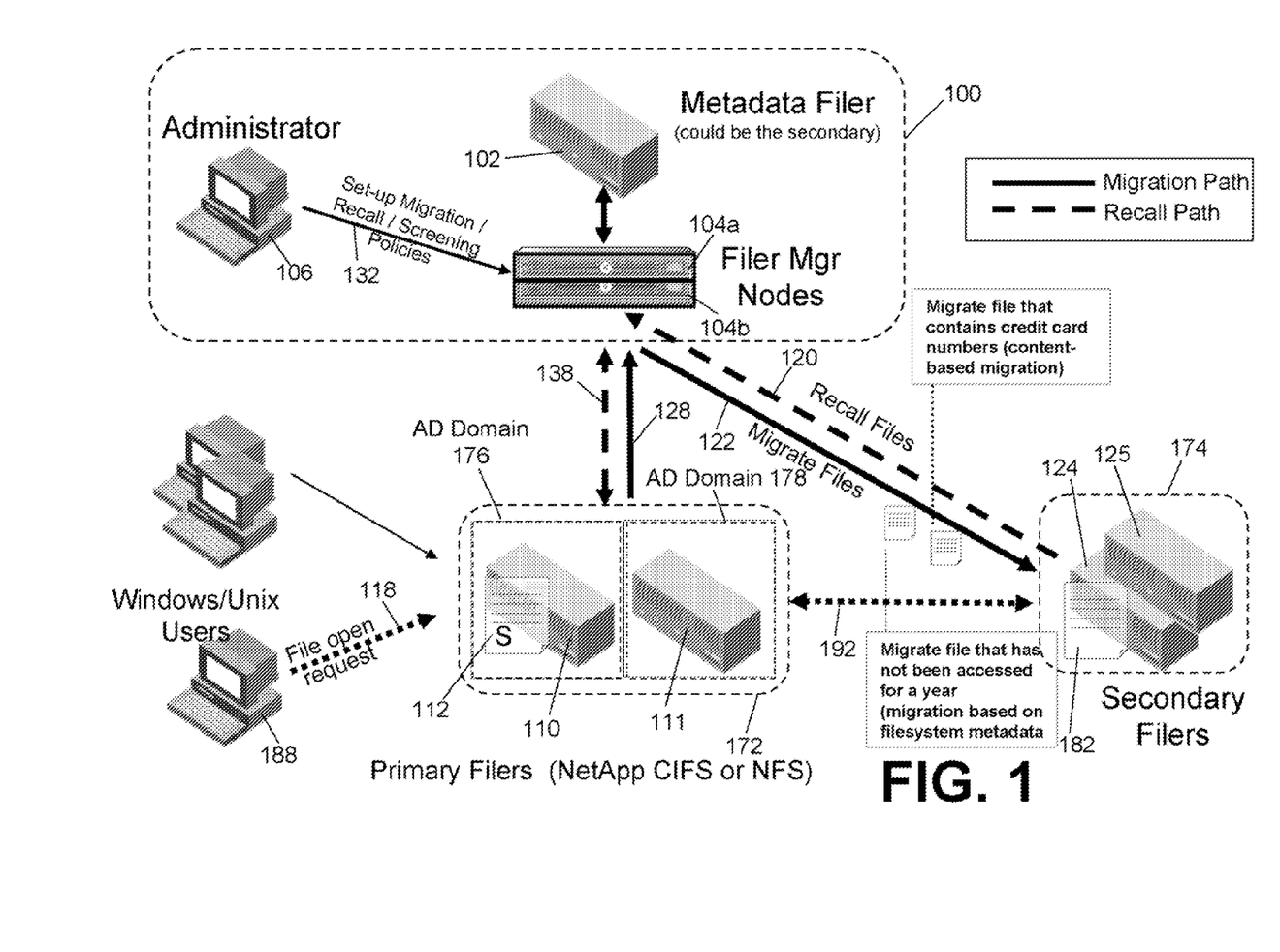
FIG. 1 illustrates a block diagram of a system for managing file movement between a first storage and a second storage in accordance with one or more embodiments of the present invention.

FIG. 1 illustrates a block diagram of a system 100 for managing file movement between a primary storage 172 and a second storage 174 in accordance with one or more embodiments of the present invention. Primary storage 172 may include a plurality of filers, such as filers 110-111. Second storage 174 may also include a plurality of filers, such as filers 124-125.

Filers 110-111 may belong to the same active directory domain (AD domain, or authentication domain). Alternatively, filers 110-111 may also belong to different AD domains, such as AD domains 176 and 178. For example, filers 110-111 may be managed by different departments in an enterprise. In one or more embodiments of the invention, filers 110-111 may be serviced by the same cluster of file manager nodes 104a-b (or nodes 104a-b) of system 100 or by the same node, e.g., node 104a. In contrast, in prior art systems, filers serviced by the same file manager node typically belong to the same AD domain, and filers in different AD domains may require different file manager nodes, which may have inconsistent policies.

Advantageously, embodiments of the invention may provide simpler and more consistent management of file movement than prior art systems. Further, with a many-to-many relation between filers and file manager nodes, embodiments of the invention may be substantially more scalable than prior art systems.

System 100 may include an administrator client 106 for a system administrator to configure policies/rules, such as migration, recall, and/or screening policies, in one or more one or more file manager nodes of system 100, such as file manager nodes 104a-b (nodes 104a-b), through data path 132. Nodes 104a-b may perform migration, recall, and/or screening according to the policies/rules.

Migration policies may specify, for example, conditions and/or timing for migration of files from primary storage 172 to second storage 174. Examples of the conditions may include "files size greater than 1 GB and not accessed or modified in 1 year." "archived files (e.g. tar, zip) not accessed for more than 3 months," "files of User X that have not been accessed for more than 3 months," "files from a completed project," etc.

Recall policies may specify, for example, conditions and/or timing to recall or not to recall files from second storage 174 to primary storage 172. For example, a file classified as confidential may be recalled only when an access request is made by a user belonging to a particular user group.

Screening policies may specify, for example, conditions for which files to block access to, which to log access to, what files to not allow to be created in primary storage 172. For example, a screening policy may include require searching for files containing a keyword, e.g., "confidential", and moving the files containing "confidential" to secondary storage 174.

Nodes 104*a-b* may perform migration, recall, and/or screening according to the policies/rules, utilizing file content data, file metadata, data pertaining to user request, and combinations of data. Advantageously, embodiments of the invention may provide improved security for enterprise data management, in addition to saving of storage cost.

One or more of nodes 104*a-b* may perform migration based on metadata. For example, a policy may specify that files stored in any of primary filers 110-111 and having not been accessed for more than one year should be moved to at least one of secondary filers 124-125. The last access date of each file may be recorded in the metadata of the file. The metadata may be stored in a metadata filer 102, one or more of secondary filers 124-125, and/or one or more of primary filers 110-111. The files may be moved (or migrate) through data path 128 (connecting one or more of nodes 104*a-b* and one or more of primary filers 110-111) and data path 122 (connecting one or more of nodes 104*a-b* and one or more of secondary filers 124-125). Alternatively or additionally, the files may be moved (or migrate) through data path 192 (connecting one or more of primary filers 110-111 and one or more of secondary filers 124-125).

One or more of nodes 104*a-b* may also perform migration based on content and/or metadata-content combinations. For example, a policy may specify that files stored in any of primary filers 110-111 and containing a credit card number should be moved to at least one of secondary filers 124-125. The credit card number may be contained in the content of a file, but may not be recorded in the metadata of the file. Nodes 104*a-b* may include a content engine (e.g., similar to a content engine of an antivirus system) for examining the content of the files stored in filers 110-111. In contrast, a prior art file manager node may be able to perform only metadata-based migration, but may not be able to perform content-based migration.

One or more of nodes 104*a-b* may also perform migration utilizing crawling/search results, search reports, and/or relational database query results. For example, node 104*a* may search for files stored in primary filers 110-111 that contain a particular keyword, e.g., "confidential", and may move all the found files to one or more of secondary filers 124-125. In one or more embodiments, recalls (from the secondary filers to the primary filers) may be blocked during the retrieval of the found files through a search interface, even though the found files may have been moved to one or more of secondary filers 124-125. As another example, node 104*a* may move all the files that are indicated to be more than two years old in a report to one or more of secondary filers 124-125. As another example, node 104*a* may send a query to a database of primary filer 110 to obtain a list of files, and may move the files on the list to one or more of secondary filers 124-125.

In one or more embodiments, files to be moved (or migrated) may be placed in one or more queues. The files may be subsequently processed on a per-file basis in a distributed, load-balancing fashion/arrangement. According to the processing capacity and the work load of file manager nodes, e.g., nodes 104*a-b*, appropriate nodes may move the files from respective primary filers to appropriate secondary filers. According, embodiments of the invention may have finer granularity in managing file movement than prior art systems, which may typically manage file movement on a filer level.

One or more of nodes 104*a-b* may also perform recall of files.

Through a user interface (e.g., a Web browser) on client 188 (e.g., a Windows or UNIX client), a user may send a request (i.e., a trigger), for example, for opening a file 182, to one or more of filers 110-111 through data path 118. File 182 may have been moved to filer 124 and may be represented by a stub file 112 in filer 110. Given the representation by stub file 112, the user may be unaware that file 182 is actually stored in filer 124.

Stub file 112 may be a CIFS (common internet file system) or NFS (network file system) file that represents the existence of file 182. Stub file 112 may have the same filename as file 182. Stub file 112 may takes only a minimum amount of storage space for the filename and other necessary pointer data, e.g., a destination path of file 182 in the filesystem of filer 124, but may contain no content data of file 182. The content of a stub file is further discussed with reference to the example of FIG. 3.

In one or more embodiments, primary filers 110-111 may have duplicate copies of stub files and may receive requests in a round-robin fashion. i.e., primary filers 110-111 may take turns receiving requests.

One or more of primary filers 110-111, or the primary filer that receives the request, e.g., primary filer 110, may forward the request to one or more of nodes 104*a-b* in a round-robin, load-balancing, distributed and/or file-over fashion. For example, nodes 104*a-b* may take turn receiving requests. Alternatively or additionally, nodes 104*a-b* may receive request according to capacity and work load of nodes 104*a-b*. In case a node that the request is addressed fails (and does not recover before a specified time or within a time limit), the primary filer (which receives the request) may send the request to the next node according to the order of the round robin arrangement, load-balancing arrangement, and/or fail-over arrangement.

One or more of nodes 104*a-b*, e.g., node 104*a*, that receive the request/trigger may retrieve the requested file 182 from filer 124, where file 182 is stored, and then forward file 182 (or content thereof) to one or more of primary filers 110-111, or the primary filer that receives the request. e.g., primary filer 110. Primary filer 110 and/or node 104*a* may replace the content of stub file 112 with the content of file 182. The content of file 182 may be subsequently presented to the user by client 188, e.g., through a Web browser.

File 182 may be recalled from secondary filer 124 to primary filer 110 through data path 120 (connecting one or more of nodes 104*a-b* and one or more of secondary filers 124-125) and data path 138 (connecting one or more of nodes 104*a-b* and one or more of primary filers 110-111). Alternatively or additionally, File 182 may be recalled from secondary filer 124 to primary filer 111 through data path 192 (connecting one or more of primary filers 110-111 and one or more of secondary filers 124-125)

One or more of nodes 104*a-b* may also manage recall of files according to one or more recall policies and/or screening policies configured by the administrator through administrator client 106. Example arrangements for managing recall of files may include a default arrangement and a controlled arrangement.

The default arrangement may provide transparent and non-disruptive access to all files, including migrated files, i.e., files that have been moved from primary filers 110-111 to secondary filers 124-125. The default arrangement may allow access by various end users, applications, servers, laptops, and desktops.

The controlled arrangement may be based on the recall policies and/or screening policies. For example, the controlled arrangement may block particular IP addresses, DNS names, or users. The controlled arrangement may also block access based on file attributes (e.g., file size, filename, file type, etc), user attributes, data pertaining to IP addresses, hostnames, etc. The controlled arrangement may not allow certain software applications (e.g. antivirus or backup) to follow placeholder files (e.g., block access using backup admin account or IP address). The controlled arrangement may allow recall (based on an inclusive policy) of files to primary filers by user data, IP address, or metadata, at time of access. The controlled arrangement may leave a copy of recalled files on primary filers, or remove the copy from the primary filers after the files are closed. The controlled arrangement may throttle or cap the amount of recalls per user, e.g., allowing up to a number of recalls per minute or a number of megabytes per second. The controlled arrangement may recall files without permanently retaining recalled files in primary filers.

The controlled management for recall of files may utilize metadata, content, and/or metadata-content combinations. The controlled management for recall of files may also utilize data pertaining to requests/triggers, e.g., IP addresses, usernames, etc. The controlled management for recall of files may also utilize a crawling/search result, a search report, and/or a relational database query result.

Figure 2:
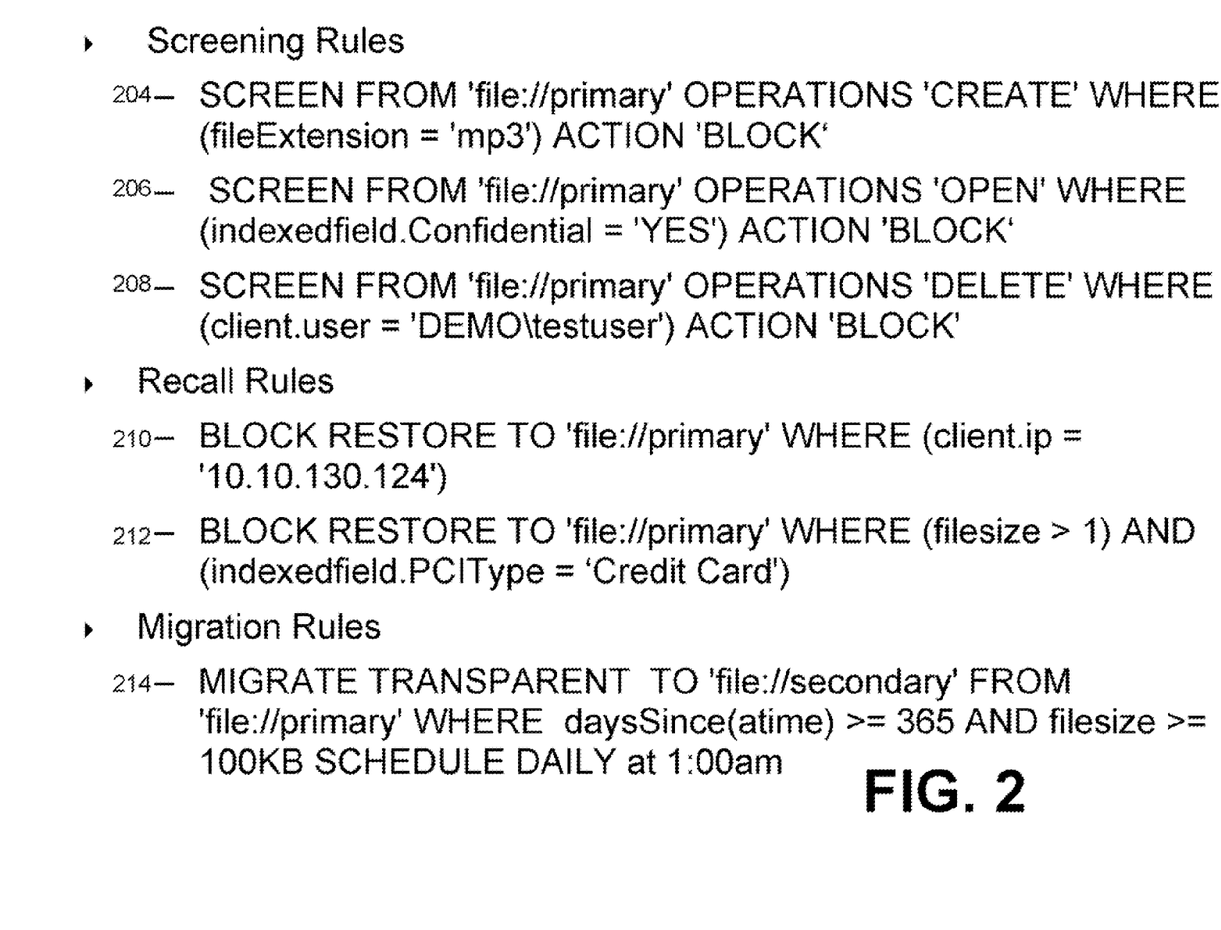
FIG. 2 illustrates statements for screening, recall, and migration policies/rules utilizing a SQL-based in accordance with one or more embodiments of the present invention.

FIG. 2 illustrates statements for screening, recall, and migration policies/rules utilizing a SQL-like language in accordance with one or more embodiments of the present invention. The policies/rules may utilize one or more of file content, file metadata, data pertaining to requests/triggers, combinations of the aforementioned data, etc.

Statement 214 illustrate a rule for periodically moving, without blocking, files that have an access time of least 365 days and have a file size of at least 100 KB from a primary storage to a secondary storage. The moving (or migration) is to be performed daily at 1 am.

Statement 204 illustrates a rule for blocking operations for creating MP3 files in a primary storage.

Statement 206 illustrates a rule for blocking operations for opening files indexed/classified as confidential in a primary storage.

Statement 208 illustrates a rule for blocking a test user from deleting files in a primary storage.

Statement 210 illustrates a rule for blocking requests submitted by a client device with an IP address 10.10.130.124 for restoring files to a primary storage.

Statement 212 illustrates a rule for blocking requests for restoring files having a file size great than 1 byte and containing a credit card number as personal confidential information (PCI) to a primary storage.

Figure 3:
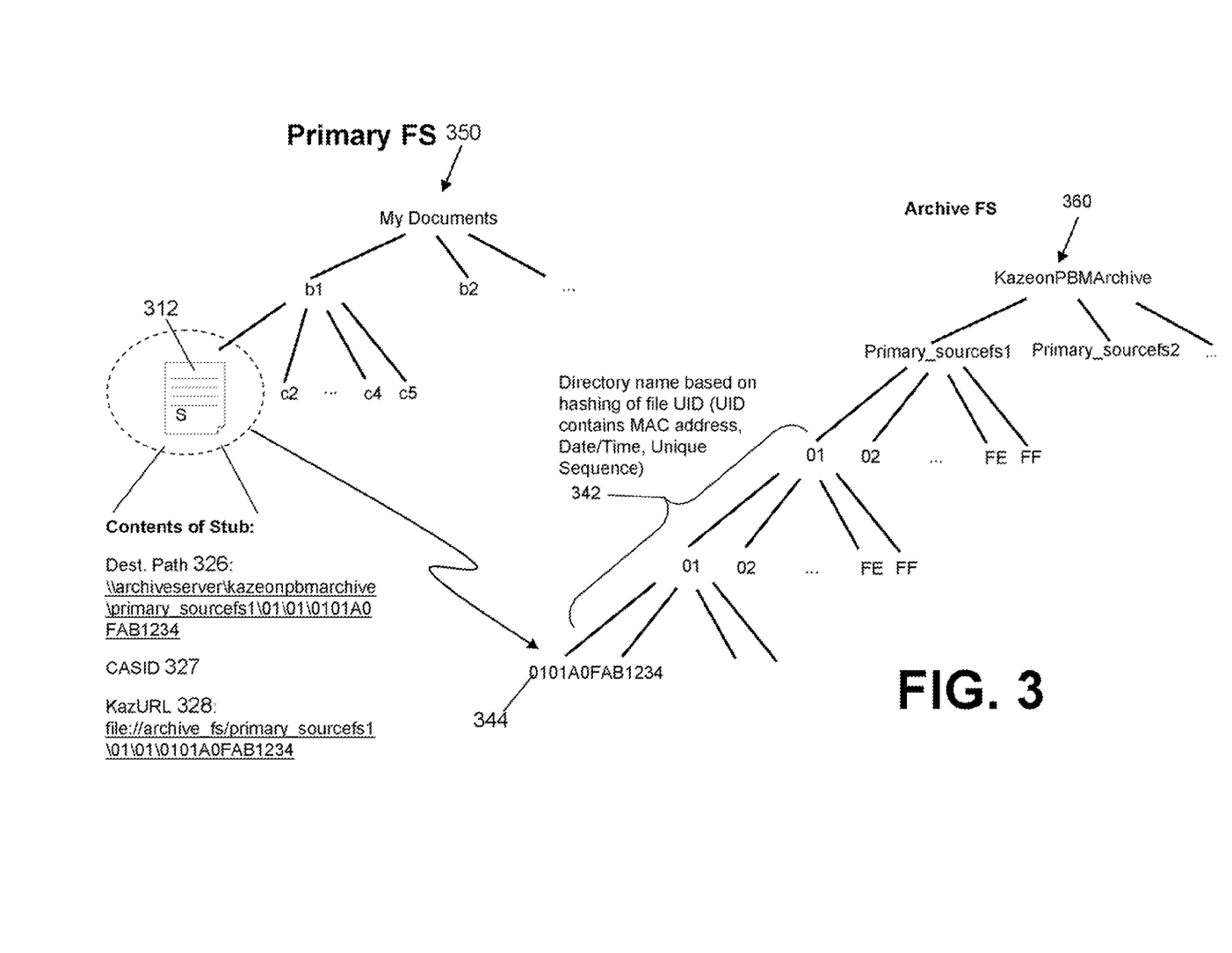
FIG. 3 illustrates a stub file in a primary storage filesystem of a primary storage and a moved file in an archive storage filesystem of a secondary storage in accordance with one or more embodiments of the present invention.

FIG. 3 illustrates a stub file 312 in a primary storage filesystem 350 (primary FS 350) of a primary storage and a moved file with a filename 344 in an archive/secondary storage filesystem 360 (archive FS 360) of a secondary storage in accordance with one or more embodiments of the present invention. Stub file 312 may represent the moved file. A file manager node (such as node 104a illustrated in the example of FIG. 1) may have moved the moved file from primary FS 350 (or the primary storage) to archive FS 360 (or the secondary storage).

Stub file 312 may be a CIFS or NFS file that represents the existence of the moved file. Stub file 312 may include one or more of a destination path 326 (or file path 326), an identifier (e.g., a Conditional Access System Identifier 327, or CASID 327), a relative URL (e.g., KazURL 328), etc.

Destination path 326 may specify where the moved file is stored and may comply with the Universal Naming Convention (UNC). In the example of FIG. 3, according to the UNC, the server name (or hostname) may be "ArchiveServer." The name of the shared folder may be "Kazeon-PBMArchive." The name of the resource (e.g., a shared directory/path) may be "Primary_sourcefs1\01\01." The filename may be "0101A0FAB1234."

CASID 327 may be a unique identification or identifier for the file. CASID 327 may be location-independent. CASID may be a function of the source file path of the file in the primary storage, the file content, and/or other unique identifiers that include the MAC address of the File Manager node that created it, the time that the corresponding metadata object was created and other sequence numbers.

KazURL 328 (or the relative URL) may represent a relative path that also may be location-independent. For example, if the file is moved from ArchiveServer to a different storage, e.g., named ArchiveServer2, destination path 326 according to the UNC may need to be changed, but KazURL 328 may not need to be changed.

The file manager node may generate a directory name 342, which may constitute part of destination path 326, for the moved file based on hashing of the unique identifier (UID) of the file. The UID may be part of CASID 327; alternatively, the UID may be CASID 327. The UID may contain one or more of MAC address, date/time of the move, a unique sequence, etc. Directly name 342 (and the destination path 326) may be generated such that the directory structure (or tree structure) of archive FS 360 may be balanced.

The directory structure (or tree structure) of archive FS 360 may be balanced for at least two purposes: performance and feasibility. A balanced directory structure of archive FS 360 may prevent directories containing an exceedingly large number of files, thereby expediting recall of files from archive FS 360. Accordingly, performance of file recall may be satisfactory even if the secondary storage is slow. Further, a balanced directory structure of archive FS 360 may enable migration of files from primary FS 350 to archive FS 360, even if significant capability disparity exists between the primary storage and the secondary storage. For example, a directory of primary FS 350 may include 1 million files, but each directory of archive FS 360 may only contain up to 5,000 files. The capability disparity may prohibit replicating the directory structure or directories, and accordingly files, of primary FS 350 in archive FS 360.

The file manager node may also generate (e.g., based on hashing the UID of the file) filename 344 for the moved file in archive FS 360.

As can be appreciated from the foregoing, embodiments of the invention may enable centralized management of file movement. Advantageously, embodiments of the invention may provide simpler and more consistent management of file movement than prior art systems and techniques.

Embodiments of the invention may also implement a many-to-many relation between filers and file manager nodes. Advantageously, embodiments of the invention may be substantially more scalable than prior art systems and techniques.

Embodiments of the invention may manage file movement based on file content, in addition to file metadata. Advantageously, embodiments of the invention may provide improved security and flexibility for enterprise data management, in addition to saving of storage cost.

Embodiments of the invention may manage file movement with one or more of distributed, load-balancing, and fail-over arrangements. Advantageously, embodiments of the invention may have higher efficiency and reliability than prior art systems and techniques.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A system comprising:
    a first storage including a first set of filers, the first storage configured to receive a request to access a file of a first set of files from a client device;
    a second storage including a second set of filers;
    a set of file manager nodes connected to the first storage and the second storage, each file manager node comprising a processor, the set of file manager nodes configured to:
        move the first set of files from the first storage to the second storage based on content data of the first set of files, wherein at least one of the set of file manager nodes is configured to search for a keyword in content included in the first storage for the content data to identify the first set of files to be moved, the keyword not being recorded in metadata associated with each of the first set of files;
        receive the request to access the file from the first storage, the request being sent by the first storage according to at least one of a round-robin arrangement, a load-balancing arrangement, a distributed arrangement, and a fail-over arrangement; and
        recall the file from the second storage to the first storage based on the received request to access the file and a recall policy; and
    a metadata filer comprising a different processor from the set of file manager nodes, the metadata filer being connected to the set of file manager nodes and configured to store data pertaining to movement of the first set of files.

2. The system of claim 1 wherein the first set of filers includes at least a first filer belonging to a first authentication domain and a second filer belonging to a second authentication domain, and the set of file manager nodes includes a file manager node configured to service the first filer and the second filer.

3. The system of claim 1 wherein the set of file manager nodes is further configured to move the first set of files from the first storage to the second storage based on at least one of a search result, a search report, and a database query result that includes the first set of files.

4. The system of claim 1, wherein the set of file manager nodes is further configured to generate at least one of one or more directory names and one or more filenames in a file system of the second storage for the first set of files.

5. The system of claim 1 wherein the set of file manager nodes is further configured to receive requests pertaining to the movement of the first set of files according to one or more of a round-robin arrangement, a load-balancing arrangement, a distributed arrangement, and a fail-over arrangement.

6. The system of claim 5, wherein the set of file manager nodes is further configured to determine whether to grant the request based on one or more screening policies and data pertaining to the requests.

7. The system of claim 1 wherein the metadata filer is configured to store metadata of a second set of files, the second set of files stored in a first filer among the first set of filers, the metadata of the second set of files configured to be applied to a copy of the second set of files in case of failure of the first filer, the copy of the second set of files not stored in the first filer.

8. The system of claim 1 wherein the first storage is configured to handle files at a higher speed than the second storage, and the set of file manager nodes is further configured to recall a third set of files from the second storage to the first storage based on at least content data of the third set of files.

9. The system of claim 8 wherein the metadata filer is further configured to store data pertaining to movement of the third set of files.

10. The system of claim 8 wherein the first storage is configured to store one or more stub files representing the third set of files before the third set of files is recalled.

11. The system of claim 10 wherein the one or more stub files contain at least information pertaining to one or more file paths specifying one or more locations in the second storage, the third set of files stored in the one or more locations.

12. The system of claim 8 wherein the first storage is further configured to remove the third set of files from the first storage after the third set of files has been closed by a user.

13. The system of claim 1 wherein the set of file manager nodes is further configured to move the first set of files from the first storage to the second storage based on at least metadata pertaining to the first set of files.

14. The system of claim 1 wherein the set of file manager nodes includes at least a content engine configured to examine the content data of the first set of files.

15. The system of claim 1 wherein at least one file manager node of the set of file manager nodes is configured to search the first set of filers to find the first set of files.

16. The system of claim 1 further comprising one or more queues, wherein the first set of files is configured to be placed in the one or more queues and configured to be processed by the set of file manager nodes on a per-file basis according to at least one of a distributed arrangement and a load-balancing arrangement.

17. A method comprising:
    moving, by a set of file manager nodes, a first set of files from a first storage including a first set of filers to a second storage including a second set of filers based on content data of the first set of files, wherein at least one of the first set of filers is configured to search for a keyword in content included in the first storage for at least the content data to identify the first set of files to be moved, the keyword not being recorded in metadata associated with each of the first set of files;
    storing, by the set of file manager nodes, data pertaining to movement of the first set of files;
    receiving, by the set of file manager nodes, a request to access a file from the first set of files, the request being sent by the first storage according to at least one of a round-robin arrangement, a load-balancing arrangement, a distributed arrangement, and a fail-over arrangement, the first storage receiving the request from a client device; and recalling the file from the second storage to the first storage based on the received request to access the file and a recall policy.

18. The method of claim 17 further comprising using a file manager node to service a first filer and a second filer in the first set of filers, the first filer belonging to a first authentication domain, the second filer belonging to a second authentication domain.

19. The method of claim 17 further comprising moving the first set of files from the first storage to the second storage based on at least one of a search result, a search report, and a database query result.

20. The method of claim 17 further comprising generating at least one of one or more directory names and one or more filenames in a filesystem of the second storage for the first set of files.

21. The method of claim 17 further comprising receiving requests pertaining to the movement of the first set of files according to one or more of a round-robin arrangement, a load-balancing arrangement, a distributed arrangement, and a fail-over arrangement.

22. The method of claim 21 further comprising determining whether to grant the request based on one or more screening policies and data pertaining to the requests.

23. The method of claim 17 further comprising storing metadata of a second set of files, the second set of files stored in a first filer among the first set of filers; and applying the metadata of the second set of files to a copy of the second set of files in case of failure of the first filer, wherein the copy of the second set of files is not stored in the first filer.

24. The method of claim 17 further comprising recalling a third set of files from the second storage to the first storage based on at least content data of the third set of files.

25. The method of claim 24 further comprising storing data pertaining to movement of the third set of files.

26. The method of claim 24 further comprising storing one or more stub files in the first storage, the one or more stub files representing the third set of files before the third set of files is recalled.

27. The method of claim 26 wherein the one or more stub files contain at least information pertaining to one or more file paths specifying one or more locations in the second storage, the third set of files stored in the one or more locations.

28. The method of claim 24 further comprising removing the third set of files from the first storage after the third set of files has been closed by a user.

29. The method of claim 17 further comprising moving the first set of files from the first storage to the second storage based on at least metadata pertaining to the first set of files.

30. The method of claim 17 further comprising examining the content data of files stored in the first storage and the second storage, the files including the first set of files.

31. The method of claim 17 further comprising searching the first set of filers to find the first set of files.

32. The method of claim 17 further comprising:

placing the first set of files in one or more queues; and processing the first set of files on a per-file basis according to at least one of a distributed arrangement and a load-balancing arrangement.

* * * * *